United States Patent [19]
Smith et al.

[11] 4,149,072
[45] Apr. 10, 1979

[54] SYSTEM FOR FLAT RIBBON OPTICAL FIBER DATA COMMUNICATIONS LINK

[75] Inventors: Robert T. Smith, Woodbury; Paul H. Binek, St. Paul, both of Minn.

[73] Assignee: Minnesota Mining and Manufacturing Company, St. Paul, Minn.

[21] Appl. No.: 822,270

[22] Filed: Aug. 5, 1977

[51] Int. Cl.² .............................................. H04B 9/00
[52] U.S. Cl. ................................. 250/199; 350/96.16; 350/96.21; 350/96.23
[58] Field of Search ...................... 250/199; 350/96.13, 350/96.15, 96.16, 96.21, 96.23

[56] References Cited

U.S. PATENT DOCUMENTS

| | | | |
|---|---|---|---|
| 3,887,265 | 6/1975 | Margolis | 350/96.23 |
| 3,920,432 | 11/1975 | Smith | 350/96.21 |
| 3,937,559 | 2/1975 | Ferrentino | 350/96.23 |
| 3,984,172 | 10/1975 | Miller | 350/96.21 |
| 4,028,162 | 6/1977 | Cherin | 350/96.21 |
| 4,072,399 | 2/1978 | Love | 250/199 |

*Primary Examiner*—Howard W. Britton
*Attorney, Agent, or Firm*—Cruzan Alexander; Donald M. Sell; William B. Barte

[57] ABSTRACT

A system for optically linking processing equipment including a flat ribbon cable containing a plurality of optical fibers supported in a flexible matrix, a connector for optically terminating fibers of the cable including a member having means for receiving and for anchoring the cable to enable the fibers to be coupled to fibers within a mated connector, and a terminal connector adapted for mating with the first connector and for providing an electrical interface with electronic data processing equipment. Both connectors include means for retaining fibers within their respective housings to enable coupling the fibers when the connectors are mated together. The terminal connector further includes an electronic circuit having a transmitter section and a receiver section, wherein the transmitter section includes at least one light source for converting an electrical input logic signal to a corresponding optical signal and wherein the receiver section includes at least one photodetector for converting an optical logic signal received through the mated connector into a corresponding electrical output signal.

13 Claims, 2 Drawing Figures

SYSTEM FOR FLAT RIBBON OPTICAL FIBER DATA COMMUNICATIONS LINK

CROSS REFERENCE TO RELATED APPLICATION

This application relates to a co-pending application by Messrs. Cherney, Binek, Magnusson and Cronk filed the same day herewith, Ser. No. 822,269, the disclosure of which is incorporated herein by reference.

BACKGROUND OF THE INVENTION (1) Field of the Invention

This invention relates to optical fiber optic data communications data link systems and in particular to such systems adapted for use with flat ribbon cables containing a plurality of optical fibers, thereby enabling duplex signal communications.

(2) Description of the Prior Art

The concept of using optical fibers in data communications is now well established. See, for example, "Fiber Optic Developments Spark Worldwide Interest", R. Gundlach, Electronics, Aug. 5, 1976. Regardless of the desirable features of interference-free, large bandwidth communications which are envisioned, the commercial utilization of such data transmitting links has been impeded by the problems of making reliable, inexpensive and low-loss connection between fibers or between a given fiber and an associated optical element such as a light source or photodetector and by problems related to the installation and complexity of the overall system. While various systems have been disclosed using fiber optic receiver-transmitter modules, see, for example, U.S. Pat. Nos. 3,809,908 (Clanton) and 4,019,048 (Maione et al), such systems are complex, utilize non-standardized components, and may not be amenable to data communication links where single optical fibers are provided for coupling between a given light source and photodetector.

Recently, a fiber optical cable system has been introduced by Quadri Corporation, Tempe, Arizona (OPTI-CABLE TM Model 2403) which includes a single optical fiber cable connecting a transmitter module to a receiver module. That system is designed for use with 0.5 inch (12.7 mm) centered card cage assemblies, but requires separate interfacing receiver and transmitter modules and provides for only one way signal flow.

SUMMARY OF THE INVENTION

In contrast to prior art optical fiber communications systems in which a bundle of cables are provided or in which isolated fibers are included in a coaxial-like cable, the present invention is directed to a fiber-optic data link system based on the use of a flat ribbon cable containing at least a pair of optical fibers supported in a flexible matrix. The advantages of such cables in conventional electrical communications links are now well known, and include advantages including low cost construction, ease of installation in existing building, and low profile, thus achieving an inconspicuous appearance. Despite such known advantages in electrical applications, such flat ribbon cables have not heretofore been known to be used with optical fibers.

The development of such a cable has led to the system of the present invention, which system includes such a flat ribbon optical fiber cable, a cable connector adapted for optically terminating fibers of the cable wherein the fibers are accessible to be optically coupled at a front portion of the connector, and a terminal connector for mating with the cable connector and for providing an electrical interface with electronic data processing equipment.

The cable connector includes a housing member having means for receiving and anchoring an end of the optical fiber cable and members associated with the termination of the fibers within the housing member. The housing member includes a front portion at which the ends of the fibers are positioned to be accessible to be optically coupled to a mated terminal connector to enable optical data signals to be coupled into and out of the mated terminal connector and means for engagement with a corresponding front portion of a said terminal connector. The cable connector further comprises optical fiber retaining means for positioning and anchoring the fibers within the housing member to provide access to the fiber ends at the front portion.

The terminal connector of the system of the present invention adapted for mating with the cable connector and for providing an electrical interface with electronic data processing equipment comprises a second housing member, a second set of fiber retaining means for positioning and anchoring fibers within the housing and electronic circuit means positioned within the housing and electro-optically coupled to fibers within the second set of retaining means for converting electrical input data logic signals into corresponding optical output signals and input optical data signals received through the first recited connector into corresponding electrical output signals. The second housing member includes a front portion and means for positioning the second set of fiber retaining means therein such that the fibers therein are axially aligned normal to and protruding through the front portion. The second set of retaining means includes means for positioning and anchoring optical fibers therein such that one end of the fibers is terminated protruding through the front portion and substantially co-planar with an end of the retaining means, thereby making the ends of the fibers accessible to be optically coupled to fibers within the cable connector when the connectors are mated together.

The electronic circuit means within the second housing member includes a transmitter section for receiving electrical input data logic signals and for converting the received signals into corresponding optical logic signals, which signals are coupled to fibers within the second set of retaining means and further includes a receiver section also coupled to fibers within the retaining means for receiving optical input data logic signals and for converting those signals into corresponding electrical output signals. The transmitter section includes at least one light source such as a light emitting diode and a modulator-driver means for coupling the electrical input data logic signals to the light source and for driving the light source to cause the output of the light source to vary in intensity corresponding to the electrical input signal. Conversely, the receiver section comprises at least one photodetector, a current to voltage converter means for transferring variations in current through the photodetector corresponding to variations in light intensity transmitted through a fiber coupled to the photodetector into corresponding variations in voltage and amplifier means coupled to the converter means for producing output electrical data logic signals corresponding to the voltage variations consistent in a format with input electrical data logic signals received by the transmitter means, which format is compatible with electronic data processing equipment to be coupled thereto.

The system of the present invention is thus adapted to provide at least a duplex communications link providing electrical interference-free two-way communications of digital signals transmitted from and received into electronic data processing equipment through a single flat ribbon optical fiber cable. The other end of the cable may be coupled, such as through another set of mated cable and terminal connectors, to other data processing equipment.

DESCRIPTION OF THE PREFERRED EMBODIMENTS

Figure 1:
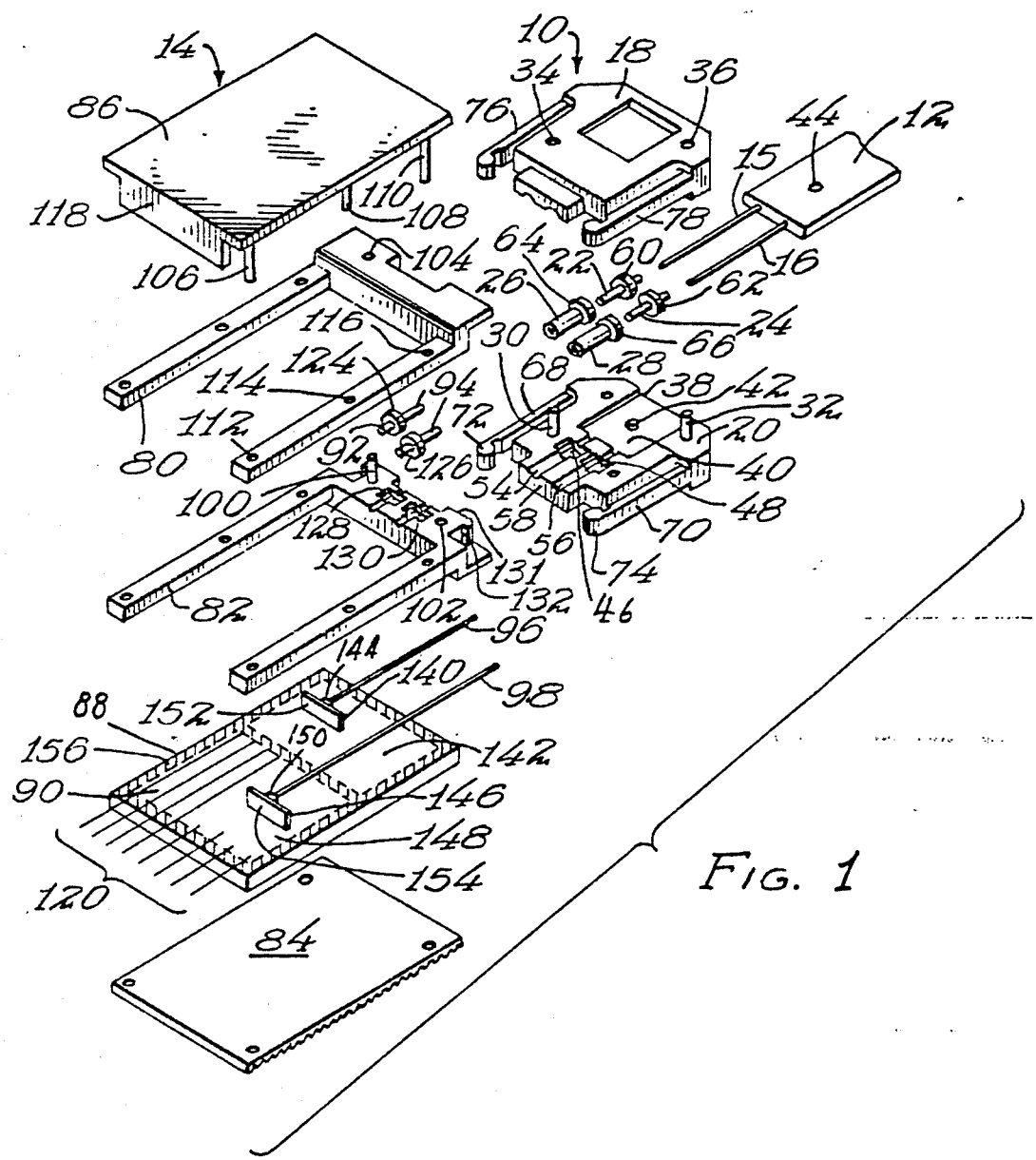
FIG. 1 is an exploded view of a cable connector adapted to be mated with a terminal connector according to the present invention.

A preferred embodiment of the system of the present invention is shown in an exploded view in FIG. 1. The system includes a cable connector 10 adapted for coupling to a flat ribbon optical fiber cable 12 and a terminal connector 14. The cable 12 contains a pair of optical fibers 15 and 16 supported in a flexible matrix as discussed in detail in the afore-referenced application of Cherney et al. As fully disclosed and claimed in that patent application, the cable connector 10 preferably comprises two identical housing members 18 and 20, together with a pair of fiber retaining members 22 and 24, respectively, and a matching pair of alignment sleeves 26 and 28. The housing members 18 and 20 are preferably injection molded of a thermoplastic such as polycarbonate or the like. Each member includes projecting pins such as the pins 30 and 32 on member 20 which mate with corresponding openings in the respective opposite member, such as openings 34 and 36 in member 18 such that when the members are pressed together, the pins are pressed into the holes to maintain the connector halves together in approximate alignment. The interior of the housing members 18 and 20 are shaped to provide a rear open 38 which defines a passageway 40 corresponding in size and shape to a cable such as that of the cable 12 which is to be received and anchored in the housing. The passageway 40 has an extended planar portion into which the flexible matrix of the cable 12 may be inserted. The flat portion is provided with a projecting pin 42 which mates with a similar pin in the half 18 of the housing. When a cable 12 is to be assembled with the connector, a hole 44 is punched between the fibers 15 and 16 through the flexible matrix of the cable 12. This hole thus anchors the cable on the pin 42 within the housing and relieves strain on the optical fibers should pressure be placed on the cable independent of the connector housing. Furthermore, the positioning of a hole 44 in the end of the cable facilitates subsequent jigging operations in order to appropriately position the ends of the fiber within associated connector elements. Extending forward of the passageway 40 and in general alignment with the axis of the optical fibers within the cable 12 are channel means through which the fibers may extend and which includes a pair of larger cavities 46 and 48, respectively. The channel means thus includes a pair of small openings leading from the passageway 40 into the larger cavities 46 and 48, and larger axial openings 54 and 56 which terminate at a forward portion 58 of the connector housing. Each of the cavities 46 and 48 is adapted to receive one of the retaining members 22 or 24 inserted into one of the alignment members 26 or 28, respectively.

The fiber retaining members 22 and 24 comprise a short section of stainless steel tubing press fitted into brass flanges 60 and 62 such that a short end protrudes beyond one side of the flanges, facilitating alignment of the members within the small openings from the passageway 40, and provides means for retaining the fibers in axial alignment. Such tubing is commercially obtainable in a variety of inside and outside diameters, and is thus readily selected to provide an inside diameter slightly greater than that of the optical fibers to be utilized therewith. Accordingly, an optical fiber 15 or 16 may be inserted into the retaining members 22 or 24 such that the end of the fiber is substantially co-planar with the end of the retaining member 22 or 24. The fiber is then permanently secured within the retaining member such as with an epoxy resin. The outside diameter of the members 22 and 24 is similarly selected to be received into a close fitting relationship within the alignment members 26 or 28. The radial flanges 60 and 62 are of appropriate size to fit within the larger cavities 46 and 48 while allowing for a slight radial and axial movement therein, thereby providing for strain relief for the fibers and limited freedom of movement to optimize optical coupling therebetween.

The cable connector 10 also preferably includes alignment members 26 and 28 which are also preferably constructed of brass and are fabricated to have an inside diameter which is slightly greater than the outside diameter of the retaining sleeves 22 and 24. The alignment members 26 and 28 are also provided with radial flanges 64 and 66 of similar size and shape as the flanges 60 and 62 such that when the retaining members 22 and 24 are inserted into the alignment members 26 and 28, the flanges abutt and may be jointly received into one of the cavities 46 or 48. The forward portion of each alignment member 26 or 28 is thus adapted to fit into the forward portions of the channels 54 and 56 in axial alignment with the cable 12 such that the forward opening portions thereof are accessible through the front portion 58 of the housing. When thus assembled, the fiber retaining members 22 and 24 having the ends of the fibers 15 and 16 permanently anchored co-planar therewith are inserted approximately half-way into the alignment members 26 and 28. These assembled members are received into the cavity such that the forward end of each alignment member 26 and 28 protrudes a slight distance ahead of the front portion 58 of the housing. Each alignment member 26 and 28 is preferably flared on both ends to facilitate entry of a retaining member 22 or 24 into the rear opening and to further facilitate entry of a similar retaining member of a mated terminal connector 14 into the front opening.

The connector further includes an engagement means such as latch means comprising a pair of resilient fingers 68 and 70 on opposite sides of the housing and having latching detents 72 and 74 on the forward ends, which fingers are adapted to mate with corresponding members on a mated terminal connector 14.

As discussed above, the connector halves 18 and 20 are preferably formed of an injection molded plastic and are of identical construction, hence the upper half 18 thus includes the same cavities as those shown in the lower half 20. When the halves are mated together, portions of each half cooperate to complete the inner cavities. Similarly, the resilient fingers 68 and 70 on the lower half 20 have corresponding counterparts 76 and 78 in the other connector half 18.

In the embodiment shown in FIG. 1, the cable connector 10 is adapted for use with a flat ribbon optical fiber cable 12 having a pair of optical fibers 15 and 16 approximately 10 mils (0.25 mm) diameter embedded within an extruded flexible vinyl matrix having an outer width approximately one-half inch (12.7 mm) and approximately 1/16th of an inch (1.5 mm) thick. The optical fibers are spaced apart approximately one-fourth of an inch (7 mm). In such an embodiment, the connector housings 18 and 20 are approximately ⅛th of an inch (3 mm) thick, approximately one inch (25.4 mm) overall width, and are approximately one and one-quarter inch (32 mm) as in overall length. The platform 40 is shaped to contain the half inch (12.7 mm) by 1/16th inch (1.5 mm) cable 12. Accordingly, the platform portion of each half of the housing 18 and 20 comprise a recess approximately 1/32th of an inch (0.75 mm) by ½ inch (12.7 mm). The projections 42 are similarly shaped to abut with each other when the housings are assembled so as to mate with a hole 44 punched in the cable 12.

The retaining stainless steel sleeves 22 and 24 have an inside diameter approximately 13 mils (0.33 mm) so as to be able to receive the fibers 15 and 16. The fibers are anchored therein by a suitable resin such as epoxy resin type 96-083 manufactured by Dow Corning Corporation. In the preferred embodiment shown in FIG. 1, the flanges 60, 62, 64 and 66 have an outside diameter approximately 3/16ths of an inch (4.5 mm), and inside diameters enabling them to be press fit onto the steel tubing.

The companion terminal connector 14 shown in the left portion of FIG. 1 is adapted to provide a termination interface between optical signals on a fiber cable such as the cable 12 and electrical signals from electronic data processing equipment (not shown). The connector 14 includes a housing formed of two identical molded plastic support members 80 and 82, which members are in turn sandwiched between a base member 84 and a cover plate 86. The connector further includes a circuit board 88 on which are positioned an electronic circuit shown generally as 90, which circuit is described in conjunction with FIGS. 2 and 3. The connector 14 further includes a pair of fiber retaining members 92 and 94 within which may be anchored short optical fiber pigtails 96 and 98 to provide optical coupling between associated optical elements within the electronic circuit module 90 and optical fibers in the other connector 10. The housing halves 80 and 82 are desirably formed of molded plastic such as a polycarbonate resin or the like. Each half contains at least one projecting pin 100 and a corresponding opening 102 such that when the halves are assembled, the pin 100 of one half of the housing is received into a corresponding hole such as the opening 104 in the opposite housing half. The cover member 86 is desirably also formed of injection molded plastic and includes a plurality of projecting pins, three of which are shown as elements 106, 108 and 110, respectively. These pins are designed to be inserted through matching holes shown as elements 112, 114 and 116 in side legs of the members 80 and 82. The base member 84 is similarly provided with a plurality of openings through which the pins corresponding to elements 106, 108 and 110 may be inserted when the connector is assembled. Following assemblage the projecting pins may then be staked to permanently lock the assembly together. A rear end portion 118 on the cover plate 86 closes the rear portion of the terminal connector 14 while allowing access for electrical connections 120 to extend from the electronic module 90. The fiber retaining members 92 and 94 are substantially identical to the retaining members 22 and 24 in the cable connector 10 and are made of stainless steel tubing press-fit within brass flanges 124 and 126. These members fit within appropriately shaped recesses 128 and 130 within the support members 80 and 82 such that the front end protrudes beyond a front portion 131 of the members 80 and 82.

The optical fibers 96 and 98 may be permanently anchored within the retaining members 92 and 94 with a front end of the fibers substantially co-planar with the ends of the members 124 and 126. The rear end of the fiber 96 is optically coupled to the light sensitive surface of a photodiode within a receiver section 142 of the electronic module 90, such as by a transparent adhesive 144, such as the "Five Minute Epoxy" manufactured by Devcon Corporation, Danvers, Massachusetts. Similarly, mechanical clips or like fasteners may be used. In like fashion, fiber 98 is optically coupled to the light emissive surface of a light emitting diode (LED) within a transmitter section 148 of the electronic module 90 by a transparent adhesive 150. In the embodiment shown, the photodiode and LED are each mounted on an insulating pedestal 152 and 154 respectively, which pedestals are affixed at right angles to the underlying substrate and are substantially enclosed by the adhesive 144 and 150. In this manner, the fiber pigtails 96 and 98 may be directly coupled to the elements without sharp bends, minimizing the space requirements. Further, electrical leads for the photodiode 140 and low signal level amplifiers may be provided on the pedestal 152. Similarly, electrical leads for the LED 146 and portions of appropriate current switching circuits may be provided on the pedestal 154. To minimize electrical interference between the receiver and transmitter sections 142 and 148, respectively, in a preferred embodiment, electrical ground planes 156 on the substrate 88 and additional shields (not shown for purposes of clarity) extending normal to the substrate are provided. Also, the receiver and transmitter sections and the respective optical elements thereof are positioned remote from each other.

The support members 80 and 82 are further shaped to have matching latch means such as the indented portions positioned on the opposite sides of the members, one of which is shown as element 132. The indented portions are thus adapted to receive the ends of the resilient fingers 72 and 74 and 76 and 78 of the first recited connector so as to lock the connectors together and maintain the respective fiber retaining members substantially butted together and in axial alignment within the alignment members 26 and 28.

While the members shown in FIG. 1 may all be formed of injection molded plastic, in a particularly preferred embodiment, the base member 84 may be desirably constructed to include a heat conducting metal or the like having means such as a corrugated outer surface for providing additional heat dissipation. Such a metal base member further provides additional electrical shielding to inhibit undesirable feedback and improve electrical stability. In such an instance, the circuit board 88 may be desirably constructed of an insulating material such as an electronic grade ceramic which is adhered to the base 84 with a thermally and electrically conductive adhesive such as the Tra-Duct adhesive type BA-2902, manufactured by Tra-Con, Incorporated, Medford, Massachusetts.

In the cable connector 10 shown in the right portion of FIG. 1, the alignment members 26 and 28 are included within the housing members 18 and 20 and the fiber retaining members 22 and 24 are inserted into one end of the alignment members 26 and 28. When the connectors 10 an 78 are mated, the second set of retaining members 92 and 94 retained within the members 80 and 82 of the terminal connector 14 are inserted into the alignment members 26 and 28 such that the front portions of both sets of fiber retaining members are abutted together, thereby optically coupling together the fibers anchored therein. Similarly, it is within the scope of the present invention that the alignment members 26 and 28 may be positioned in either of the mated connectors, it being essential only that the fiber retaining members of each connector be inserted into the alignment members such that the retaining members become butted together in axial alignment so as to appropriately optically couple the optical fibers retained therein.

Figure 2:
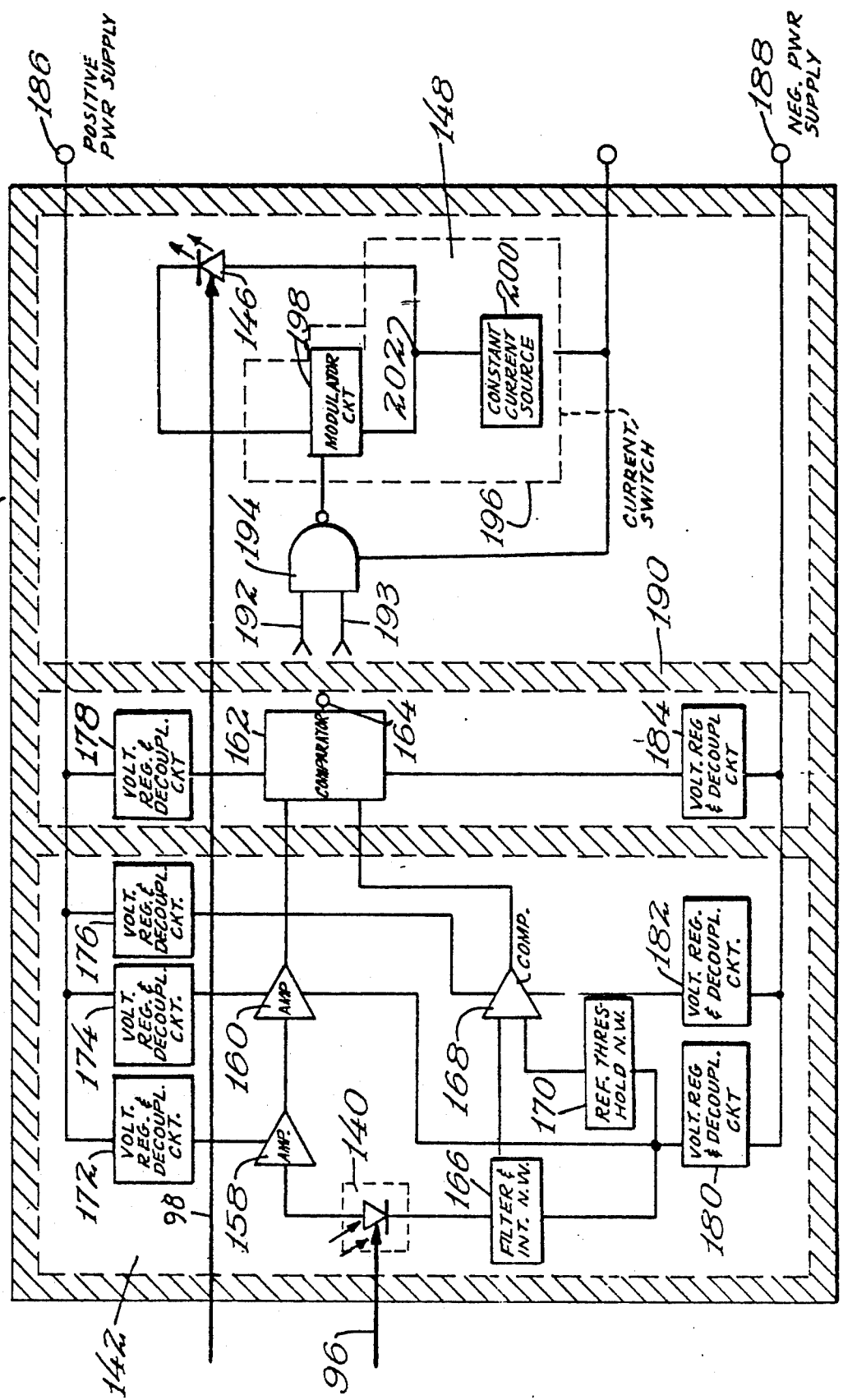
FIG. 2 is a block diagram of the electronic circuit means included within the terminal connector, showing the transmitted and receiver sections.

The electronic circuit including the receiver section 142 and transmitter section 148 shown in FIG. 1 are set forth in block diagram form in FIG. 2 and which are preferably constructed in hybrid form, including thick film passive components together with some discrete active components and some integrated circuit assemblies. The receiver section includes a photodiode 140 to which data logic signals on the fiber pigtail 96 are coupled. The output of the photodiode, in the form of a weak current of approximately 100 nanoamps, is detected by a trans-impedance amplifier 158, which consists of two low noise, high frequency transistors such as a type MPSH02 manfactured by Fairchild Semiconductor or Motorola, Incorporated. The output of the trans-impedance amplifier 158 is typically on the order of a mullivolt in amplitude for acceptable optical signal strengths and may vary between wide limits depending on the ultimate requirements of the communications link. The signal is amplified by a video amplifier 160 such as type 733 video amplifier integrated circuit such as is commonly available to provide an output on the order of 100 millivolts. The output of the video amplifier 160 is detected by a comparator circuit 162, which is preferably a TTL logic transmission line receiver such as a commonly available type 75107 to provide an output in the form of a standard TTL logic signal. The output of the comparator 162 is provided on lead 164 for coupling to suitable external data processing equipment. A filter and integration network 166 is associated with the photodiode 140 for providing a signal indicative of the average received optical signal power and includes a low pass filter to additionally decouple the photodiode 140 from an associated power supply. The output of the network 166 is fed to another comparator circuit 168 such as provided by a high impedance FET operational amplifier type CA 3140 integrated circuit manufactured by RCA Corporation. The integrating network 166 provides a signal indicative of the average optical power received by the photodiode 140. This average received optical power signal, which is in the form of a voltage, is compared with a reference voltage from a reference threshold network 170. Network 170 is adjusted to provide a predetermined reference voltage which is compared with the output of the integrating network 166 in the comparator circuit 168. If the output of the integrating network 166 is below the selected reference level from the network 170, the output of the comparator 168 is such that the comparator circuit 162 is not enabled and no signal is then provided to external equipment on lead 164. If, on the other hand, the signal from integrating network 166 exceeds the reference level signal, then the output from the comparator 168 will enable the output of 162 and the signal will be received at the external equipment. The reference signal from network 170 thus corresponds to an acceptable average optical received power level. Networks 172 through 184 consist of conventional voltage regulator and decoupling circuits, and complete the connection between positive and negative power supplies 186 and 188, respectively, and the trans-impedance amplifier 158, the video amplifier 160, the comparator 162, the received optical power comparator 168, the reference threshold network 170 and the integrating network 166 and photodiode 140. The voltage regulator circuits permit the power supply voltages to vary over wide limits and can range from 8 to 15 volts with typical components. In addition, the voltage regulator and decoupling networks prevent feedback of signal through the power supply between the various elements. To further suppress electrical interference between the elements, ground plane 190 is included to not only separate the receiver section 142 from the transmitter section 148, but to also separate the high signal level line receiver-comparator circuit 162 from the low level signal elements 158 and 160.

Considering now the transmitter section 148, digital signals from associated electronic data processing equipment are coupled into the transmitter on lead 192 together with enable signals on lead 193 to a logic gate 194, which preferably consists of one gate section of a type 74S00 integrated circuit as commonly available. The output from the logic gate 194 is applied to a current switch 196 which provides means for modulating and driving the light emitting diode 146. The switch 196 includes a modulator circuit 198 and a constant current source 200. The modulator 198 consists of all four sections of a type 74S38 quad gate integrated circuit as commonly available wired in parallel, and responds to signals from the gate 194 to selectively bypass current from the source 200. The constant current source is of conventional design and allows only a predetermined fixed current to flow to node 202. The current from node 202 then propagates either through the modulator 198 or through the LED 146, depending on the logic state of the modulator 198. If the modulator element, for example, is in a logic "one" state, then all of the current through node 202 will be conducted through the modulator 198, leaving no current to excite the LED 146. If, however, the modulator element 198 is in a logic "zero" state, then it is in a non-conducting state and all of the current from current source 200 will be conducted through node 202 to the LED element 146, turning it on.

The need for the ground plane 190 to improve isolation between sections of the module 90 becomes even more apparent when one considers the current levels associated with the LED 146, which are on the order of 200 milliamps, with a rise time on the order of 8 to 10 nanoseconds, in comparison to the level of the output associated with the photodiode 140, which is on the order of 100 nanoamps, with similar rise times. This is a difference in signal levels of the order of a factor of a million, i.e., $10^6$.

In the preferred embodiment shown in FIG. 2, the photodiode 140 is preferably a silicon photodiode such as type C30807 manufactured by RCA Corporation. Such a diode is sensitive over an extended range of wavelengths including the infrared such that the system is useful over an extended range of wavelengths as may be transmitted through the optical fiber cable. Similarly, a wide variety of other photodiodes may advantageously be used. The light emitting diode 146 is preferably provided in the form of a GaAs diode such as type FPX 2000 as manufactured by Fairchild Semiconductor Company. Such an LED emits primarily at a wavelength of 0.91 microns. Similarly, a variety of other LED's emitting over a range of visible and infrared wavelengths may be employed.

In the embodiment shown in FIG. 2, a clock rate of 20 MHz is readily provided, thus achieving a data rate of 10 megabits when input data is coded in the form of a bi-phase pulse code modulation and has been found to provide satisfactory signal to noise ratios over cable lengths in excess of 100 meters.

In the embodiments discussed above, the system of the present invention has been used to provide a duplex communication link between associated data processing equipment on both ends of a cable. Similarly, the system may be used to provide a signal repeater function in which an optical signal received on one fiber of the cable is amplified within the receiver section of the electronic module. The output of the receiver section is then directly coupled to the transmitter section by connecting the output lead 164 of the receiver with the input lead 192 of the transmitter, and the optical output of the transmitter coupled to the other fiber of the cable.

Having thus described the present invention, what is claimed is:

1. A system for optically linking data processing equipment comprising
   (a) a flat ribbon cable containing at least a pair of optical fibers supported in a flexible matrix,
   (b) a cable connector adapted for optically terminating the fibers of the cable comprising a housing member having means for receiving and anchoring an end of the cable and members associated with the optical fibers contained within the cable, a front portion a which a mated connector may be joined to said housing and optically coupled the fiber ends within the housing to enable optical data signals to be coupled into and out of the mated connector and means for engagement of a corresponding front portion of a said mated connector, and optical fiber retaining means for positioning and anchoring said fibers within the housing member such that the ends of the fibers are accessible to be optically coupled at the front portion of the housing, and
   (c) a terminal connector for mating with the cable connector and for providing an electro-optical interface with electronic data processing equipment, said terminal connector comprising
      (i) another set of fiber retaining means for positioning and anchoring optical fibers terminating coplanar with one end thereof,
      (ii) a second housing member for receiving and positioning therein said another set of fiber retaining means such that the ends of fibers retained therein may be optically coupled with the fiber ends retained within the first recited connector, and
      (iii) an electronic circuit means within the second housing member comprising
         a transmitter section including at least one light source, and
         a modulator-driver means for coupling an input logic data voltage signal to the light source such that the output of the light source varies corresponding to the input signal,
         a receiver section comprising
         at least one photodetector, and
         a current to voltage converter and amplifier means for converting the detector output to an equivalent logic data signal.

2. A system according to claim 1, wherein said housing of said terminal connector includes means for dissipating heat generated by the circuit means.

3. A system according to claim 1, wherein the terminal connector includes a substantially flat housing member having means for positioning the optically active surface of each discrete light source and photodetector aligned normal to the axis of an associated optical fiber anchored within said substantially flat housing member and wherein the electronic circuit means comprises a hybrid circuit containing integrated circuit components coupled to the discrete components, said housing and circuit means being consistent with standardized card cage constructions in which each card has an overall dimension enabling the use of a plurality of cards in a cage having card receiving slots at one-half inch (1.27 cm) centers.

4. A system according to claim 3, wherein the circuit means comprises a substantially planar insulating substrate having the said integrated circuits mounted thereon and wherein additional insulating members are affixed at right angles to the first recited substrate on which additional members the discrete optical elements are mounted to provide the aforesaid normal positioning.

5. A system according to claim 1 for providing a duplex digital communications link, wherein the circuit means includes one light source and one photodetector, each of which are positioned remote from each other and within the housing to minimize electrical coupling therebetween.

6. A system according to claim 3, wherein the circuit means further comprises electrical shielding means for electrically isolating the receiver section and positioned between low level signal and high level signal stages thereof to isolate the high level stages to minimize undesired feedback effects.

7. A system according to claim 1, wherein the modulator-driver means of the transmitter section consists of a current switch including a modulator and constant current source, in which the current from the source is selectively switched from the light source depending on the logic state applied to the modulator, while simultaneously isolating the current switch from unrelated sections of the circuit.

8. A system according to claim 7, wherein electronic circuit means comprises a ground plane for providing means for carrying a common ground connection for low current level stages of the transmitter section and for the receiver section and means for isolating the modulating current in the light source from the common ground plate to prevent coupling of relatively high current pulses into the common ground plane.

9. A system according to claim 1, wherein the receiver section comprises means for coupling electrical power to the remainder of the receiver section and isolation means for decoupling the power supply means from the remaining stages to prevent signal components from feeding through the power supply means into other stages.

10. A system according to claim 1, wherein the receiver section comprises error detection means coupled to the photodetector for monitoring the average received optical power at the detector, for comparing that power level with a predetermined power reference level and for enabling an output from the receiver only when the average received optical power exceeds the predetermined reference level.

11. A system according to claim 1, wherein the circuit means includes at least one light emitting diode.

12. A system according to claim 1, wherein the circuit means includes at least one photodiode.

13. A system according to claim 1, wherein the circuit means includes integrated circuits adapted for modulating and driving the light source and for converting and amplifying the output of the photodetector.

* * * * *